United States Patent

[11] 3,568,039

[72] Inventor Milton A. Knight
Box 113, RR 1, Centreville, Va. 22020
[21] Appl. No. 842,317
[22] Filed July 16, 1969
[45] Patented Mar. 2, 1971

[54] ELECTROCHEMICAL-VARIABLE SPEED CONSTANT FREQUENCY POWER SYSTEM
6 Claims, 5 Drawing Figs.

[52] U.S. Cl. .................................................. 321/61, 307/246
[51] Int. Cl. .................................................. H02m 5/00
[50] Field of Search .................................. 321/7, 60, 61, 68, 69; 320/1; 322/32; 307/110, 246

[56] References Cited
UNITED STATES PATENTS
3,152,297 10/1964 Peaslee ........................ 321/61
3,323,076 5/1967 Pelly ............................. 321/7X
3,332,002 7/1967 Jollois ........................... 321/61
3,378,756 4/1968 Potter ........................... 322/32
3,419,783 12/1969 Bingley ........................ 321/61X Primary Examiner—J. D. Miller
Assistant Examiner—Gerald Goldberg
Attorneys—Edgar J. Brower, Thomas O. Watson, Jr. and R. R. Anderson ABSTRACT: A power system which will produce an alternating current output at controlled frequency from a variable frequency power input source. Multiple solid state control devices divide the variable input into incremental voltage controlled pulses which are connected to bipolar electrochemical cells. Then a reference voltage and frequency circuit discharges the electrochemical cells in an order of voltage synchronized with the reference wave form to produce an accurately controlled frequency output.

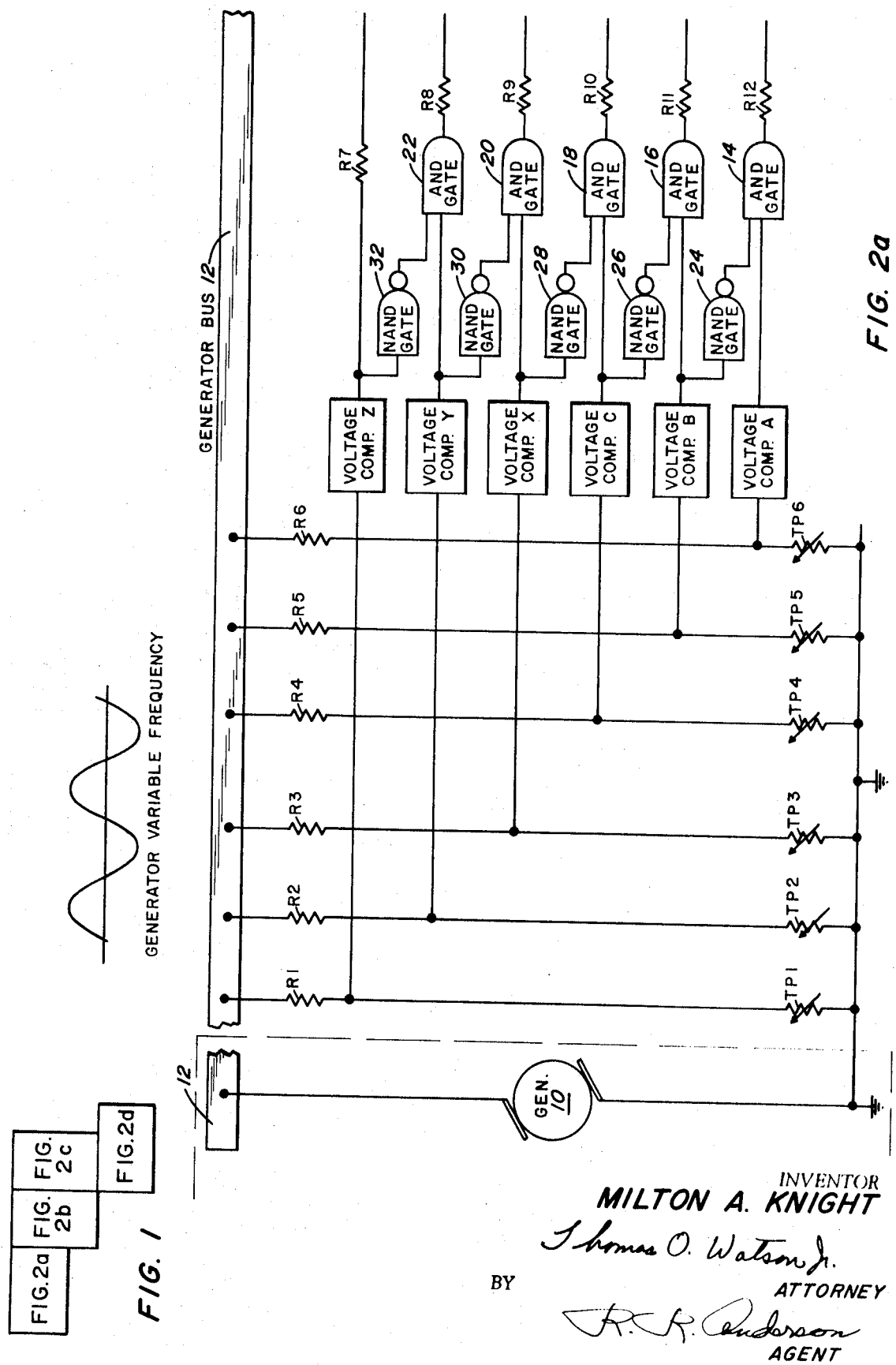

ELECTROCHEMICAL-VARIABLE SPEED CONSTANT FREQUENCY POWER SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

Most of the electric power utilized by the military organization and by industry is both generated and consumed as AC power. Much of the utilization equipment operating on alternating current is sensitive to the frequency of the power, with an appreciable percentage of this equipment requiring that the frequency be controlled within a narrow tolerance band.

In generating AC power the frequency is directly proportional to the rotating speed of the generator. Internal combustion engines or turbines, usually the prime movers of rotating generators, do not have a constant r.p.m. necessary for an acceptable tolerance limitation in frequency in the generator output. One method employed is to introduce a constant speed drive device between the prime mover and the generator which will maintain a uniform generator rotation even if the prime mover input rotational speed varies extensively. This method has not been productive of the frequency control needed and led to the development of more sophisticated method. One method is the Variable Speed Constant Frequency (VSCF) system such as developed by General Electric, in which the generator produces a very high frequency power output. A controlled frequency reference is compared against this high frequency output and at every point where the frequency voltage is identical to the generated voltage an SCR is switched on to capture a portion of the generated power. Since the generator has a frequency many times that of the reference frequency in each reference frequency cycle there will be many small portions. These portions have the contour of the frequency reference and filters shape them into a smooth sine wave. This system requires a special high speed oversize generator since only a portion of the power generated in each cycle is utilized.

Another VSCF system now in development is one in which the AC power is rectified into DC power and with the use of six inverters, each adding an increment of square wave buildup, a sine wave is formed. However, in this system the inefficiencies of the rectifier and six inverters are additive.

The present invention overcomes the disadvantages and shortcomings of the prior art systems and offers a power system which, in conjunction with the AC output power, contains means for providing power for high surge or peak loads without strain or overload on the generator, and which provides emergency AC and DC power for extended periods of time after generator failure.

The electrochemical cells which form an integral part of the conversion are inherently capacitive and will tend to establish a unity power factor for any electrical system inductive loading.

This conversion system is slaved to a frequency and voltage signal generator and will reproduce the frequency and voltage stipulated by the reference frequency and voltage wave form.

An object of the present invention is a provision of a power system which converts a variable frequency input to a controlled frequency alternating current output.

Another object is the provision of a power system for providing power for high surge or peak loads without strain or overload on the input generator.

Still another object of the present invention is the provision of a power system which will provide emergency AC and DC power for extended periods of time after generator failure.

Still another object of the present invention is a provision of a power system which exhibits great flexibility with respect to frequency and wave form selection.

Other objects and many of the attendant advantages and novel features of the invention will become apparent from the following detailed description of the invention when considered in conjunction with the accompanying drawings.

BRIEF DESCRIPTION OF THE DRAWINGS

FIG. 1 shows the manner in which the drawings may be assembled to provide a complete schematic of the invention;

FIG. 2$b$) shows the circuitry for charging the electrochemical cells during the first and second quadrants;

FIG. 2($c$) shows the circuitry for charging the other cells during the third and fourth quadrants; and FIG. 2($d$) shows the circuitry for discharging the cells in accordance with the reference wave form.

DESCRIPTION OF THE PREFERRED EMBODIMENTS

Figure 2B:
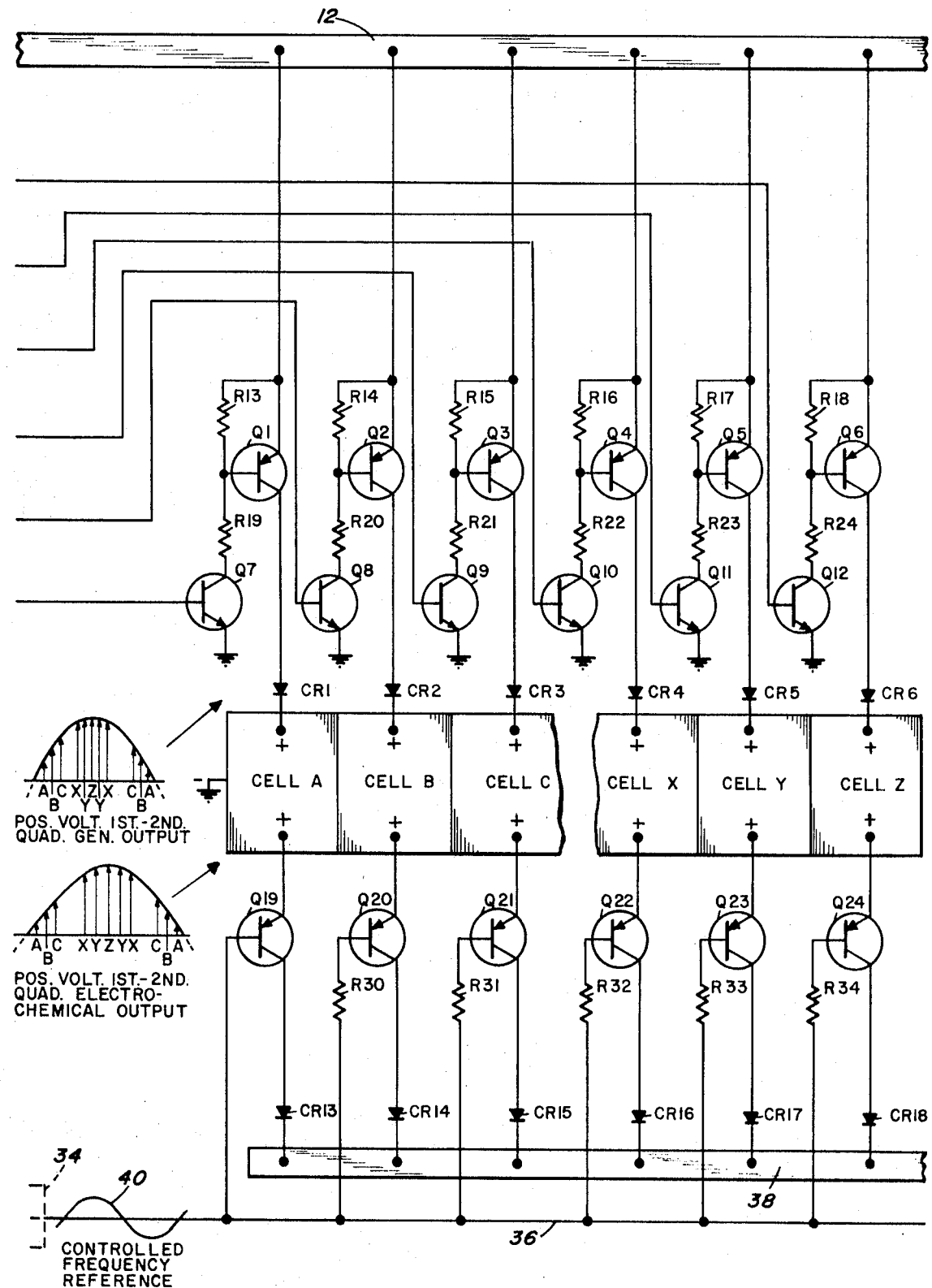
FIG. 2($a$) shows the circuit components used to sample increments of the generator voltage.
Figure 2C:
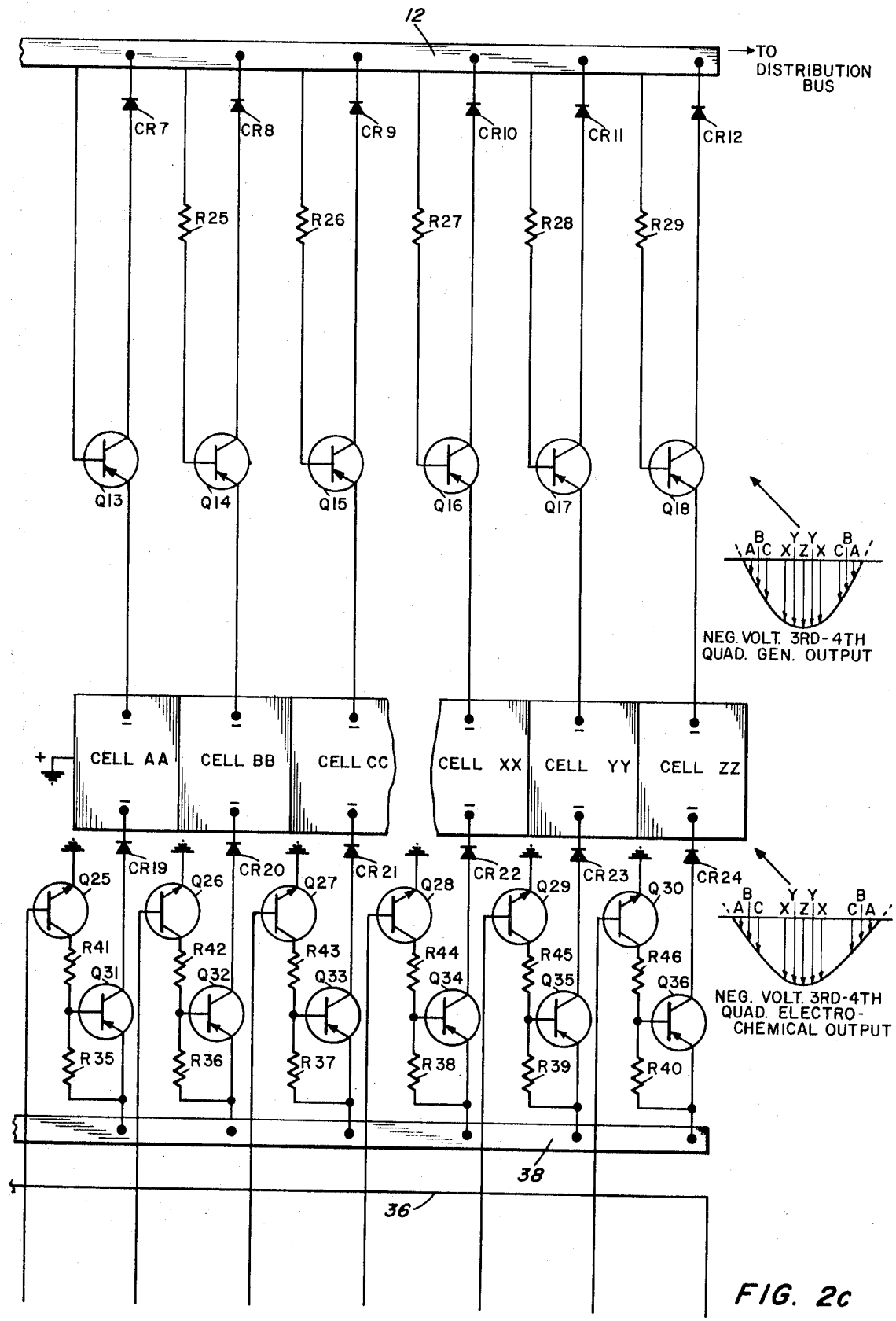
Figure 2D:
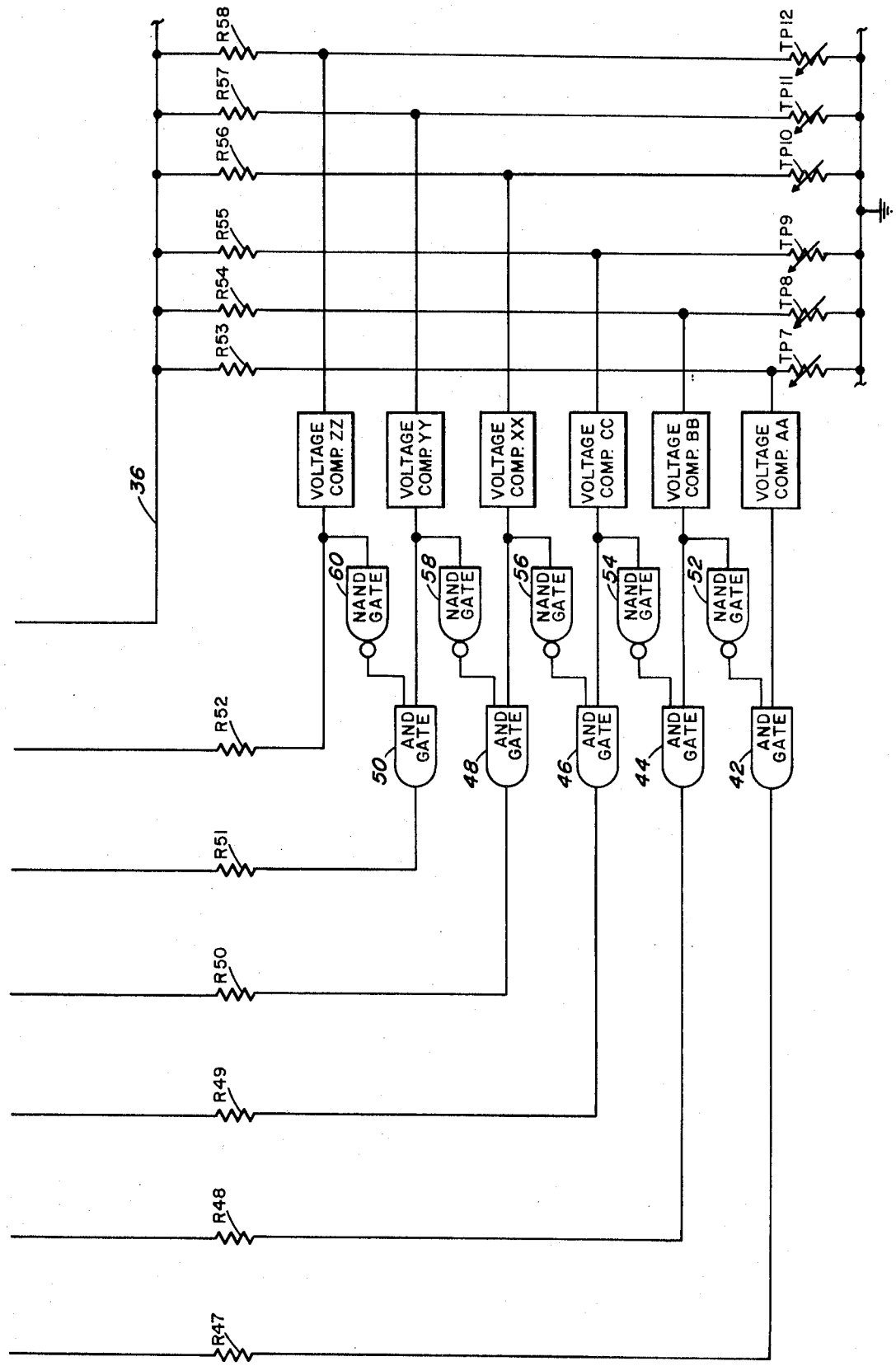

Referring now to the drawings there is shown a variable frequency generator 10 which is connected between a generator bus bar 12 and the ground. Generator 10 may be of any well-known construction and operates at any variable frequency. Connected between the generator bus 12 and ground there are a plurality of voltage divider circuits consisting of six resistances R1, R2, R3, R4, R5 and R6 these fixed resistances being connected in series with adjustable potentiometers TP1, TP2, TP3, TP4, TP5 and TP6. It may be noted at this point that the number of voltage divider circuits utilized, as well as the other related stages, will depend upon the number of comparisons that are made between the variable frequency input and a controlled frequency reference voltage, as will be described more fully hereinafter, and for the sake of simplicity only a single channel will be described fully but it being understood that the remaining channels operated in a like manner.

Connected between the two resistors R6 and TP6 of the voltage divider circuit there is a voltage comparator A whose output is connected to AND gate 14, this element passing the signal on to a series resistor R12 before applying it to the base of a NPN transistor Q7. NAND gates 24, 26, 28, 30 and 32 are connected between the AND gates of each channel and the comparator of the next higher channel. Transistor Q7 has its emitter element connected to ground and its collector connected to a resistance R19, the other end of this resistance being connected to the base of a PNP transistor Q1. Resistance R13 connects the base and emitter of transistor Q1 the emitter also being tied to the generator bus 12. The output of transistor Q1, as applied on it's collector electrode passes through a diode CR1 before being applied to electrochemical cell A.

The negative terminal of electrochemical cell A is connected to ground and its second positive terminal is connected to the emitter of a PNP transistor Q19. The output of transistor Q19 as produced on its collector electrode passes through a diode CR13 and is applied to a distribution of utilization bus bar 38.

A controlled frequency reference signal is produced by a signal source 34 which may be any well-known signal generator or other means of producing a constant frequency wave form such as 40 and of any desired frequency. The output of signal source 34 is applied to a line 36 which is connected to the base of transistor Q19 to serve as a means for cutting on and off that transistor, and the others as will be defined hereinafter.

The above description has been for the positive voltage for the first and second quadrants of the sine wave so turn now for a description of one of the channels for handling the third and fourth quadrants of the negative portion of the wave. In this situation transistor Q13 has its base attached to the generator bus 12 and its collector electrode is connected to the bus also, but through a rectifier CR7. The emitter electrode of Q13 is attached to the negative terminal of electrochemical cell AA, and it should be noted that in this situation the positive electrode is grounded. The other negative electrode of cell AA is connected to a diode CR19 and this in turn connects to the collector electrode of transistor Q31 whose emitter electrode is connected to distribution bus 38. The base of transistor Q31 is tied to a resistor R41 which in turn is connected to the emitter electrode of transistor Q25 whose base is connected to a resistance R47 the other terminal of which connects to an AND gate 42. AND gate 42 has input supplied by NAND gate 52 and voltage comparator circuit AA, the input of voltage comparator AA being tied to one end of potentiometer TP7. Potentiometer TP7 forms, along with fixed resistor R53, a voltage divider circuit which is connected between ground and the control frequency reference line 36. It should be noted at this point again that the structure just recited in detail above is that which relates to a single sampling channel, and that the remaining channels, as for example with electrochemical cells A, B, C... to X, Y and Z, are likewise all connected in the same manner. The number of channels chosen depends on the number of samplings it is desired to take during one cycle of operation.

Turning now to the operation of the invention it will be observed that the invention consists of a conversion system to be used in conjunction with a variable speed AC generator and a controlled voltage and frequency reference device. The system includes multiple solid state control devices which divide the output of the generator into incremental voltage controlled pulses and feeds these pulses into series connected bipolar electrochemical cells. The voltage of each pulse will direct the pulse into a cell which has the same charging voltage as the voltage of the pulse. The number of pulses per quarter cycle of the generator equals the number of electrochemical cells. These pulses set up the double layer capacitance in the electrochemical cells.

The reference voltage and frequency circuit utilizes solid state devices and circuitry to discharge the double layer capacitance energy of the electrochemical cells in an order of voltage synchronized with the reference wave form. The third and fourth quadrants of the cycle, being negative in direction, requires an identical system as the first and second quadrants except that the polarity is reversed. Referring to the drawings it will be seen that a variable speed generator 10 furnishes variable frequency power into a generator bus 12. Beginning a cycle at 0 voltage, no charging of the electrochemical cells takes place until the bus voltage exceeds "A" volts. At this point the lowest AND gate 14 produces a "1" output which drives transistors Q7 and Q1 into conduction so that current flows from the generator bus 12 through transistor Q1 and diode CR1 into electrochemical cell A, thereby allowing electrochemical cell A to be charged with a double layer capacitance. Charging of "A" will continue as long as the voltage on bus 12 is between "A" and "B." When the bus voltage exceeds "B" volts transistors Q7 and Q1 will be turned off because the lower NAND gate 24 will produce a "0" output and thereby disable the Q7 and Q1 transistors. Simultaneously with this event Q8 and Q2 will be driven on, and remain on, until the bus voltage exceeds the "C" voltage. This process will continue through "Z" voltage which is the highest voltage of the electrochemical cells. As the bus voltage decreases, conduction of the electrochemical cells will pass through each successive voltage stage exactly in the reverse of the voltage increasing procedure.

On the distribution side of the conversion system the controlled frequency and voltage reference 34, which produces the output wave form 40 onto line 36, controls the action of the cell discharges. Starting at reference voltage 0 no power is discharged into the distribution bus 38 from the electrochemical cells. When the reference voltage reaches "A" voltage Q19 is turned on and the double layer capacitance of cell A is discharged into the distribution bus 38 at "A" voltage through diode CR13. When the reference voltage reaches B volts, Q20 is turned on and cell B discharges, increasing the voltage of the distribution bus 38 to that of the reference voltage at the identical time. Transistor Q19 need not be turned off since the diode rectifier CR13 prevents any power form flowing back into cell A. This process is repeated through cell Z, and as the reference voltage drops the discharges of the cells follows the same procedures in reverse as when the voltage increased.

During the first and second quadrants of the cycle the voltage is positive and the negative of the electrochemical cells A through Z is grounded. On the third and fourth quadrants the voltage is negative and the positive of electrochemical cells AA through ZZ is grounded. This means that in the third and fourth quadrants of a cycle power flows from the generator 10 through ground to the cells and back to the generator through the generator bus 12. On the distribution side during the third and fourth quadrants power flows from the cells AA through ZZ through ground to the utilization equipment attached to bus 38 and back to the cells through the distribution bus 12. A separate set of solid state devices, circuitry and electrochemical cells are used for the third and fourth quadrants. A and D gated 42, 44, 46, 48 and 50 and NAND gates 52, 54, 56, 58 and 60 are connected to the frequency and voltage reference 34 thereby controlling transistors Q25 through Q36 in the same manner as Q1 through Q12 on the generator bus 12 for the first and second quadrants. The cells AA through ZZ will be charged from the generator 10 by transistor operation controlled by the generator bus 12 negative voltage during the third and fourth quadrants. The output of the distribution bus 38 will consist of a series of pulses, equal to twice the total number of cells per cycle, having the exact wave form and frequency as the reference 34. These pulses are than fed into a filter for wave form refinement and other utilization.

The frequency and voltage reference 34 need not be constructed as a part of the conversion system, since the conversion system will duplicate any wave form the frequency reference may have. Thus, very accurately controlled frequency references may be desirable for the system when supplying power to highly sophisticated equipment, while odd frequencies and wave forms (sawtooth, square, and so forth) may be desired for other applications.

As alternate forms of construction for the invention it is conceivable that by the development of suitable solid state circuitry, that one set of electrochemical cells and controls would perform all necessary functions. One the cell charging side this is simple, merely by using a bridge rectifier giving half wave positive voltage output. Thus, only first and second quadrant controls are necessary to give the double layer capacitance formation in the electrochemical cells. The difficulty comes in the output side however, where the reference cycle would also be rectified into half waves and every other half wave discharge of the electrochemical cells would be inverted to give an AC cycle wave form.

Bipolar electrochemical cells using either rigid or liquid electrodes are preferred since conventional batteries are not practical due to their high inductance offsetting the double layer capacitance necessary to make this system work successfully.

From the above description of the structure and operation of the invention it is obvious that there is presented an entirely new concept for combining overload and surge load capability, AC and DC combination power, emergency AC and DC power, flexibility of frequency and wave form selection, and usage of available of AC generators. It has application on any electrical system where frequency control and emergency power is important, or where extensive surge or peak loads are experienced. Typical usage would be on mobile power units serving aircraft and radar or missile installations, and the invention can be built as a compact unit with no moving parts and attached to an available AC generator.

Obviously many modifications and variations of the present invention are possible in light of the above teachings.

I claim:

1. An electrochemical variable speed constant frequency power system comprising:
   a source of variable frequency alternating current signals;
   means for dividing the signals into incremental pulses;

storage means comprised of electrochemical cells;

means for applying the incremental pulses to the storage means;

a controlled voltage and frequency reference device connected to the storage means;

an output bus bar; and means for discharging the storage means into the bus bar in an order of voltage synchronized with the reference wave form.

2. The power system of claim 1 wherein the source of variable frequency alternating current signals is a variable speed alternating current generator.

3. The power system of claim 2 wherein the means for dividing the signal into incremental pulses comprises a plurality of voltage dividers connected to the AC generator, the dividers operating in sequence at different potentials, there being a divider for each increment of voltage taken.

4. The power system of claim 3 wherein there is a plurality of solid state devices connected to the voltage dividers, the solid state devices being forced into conduction by the potential on the voltage dividers.

5. The power system of claim 4 wherein the storage means comprises a plurality of bipolar electrochemical cells capable of exhibiting double layer capacitance.

6. The power system of claim 5 wherein the means for discharging the storage means is a plurality of voltage dividers and solid state devices which are sequentially forced into conduction by the controlled voltage and frequency reference device.